UNITED STATES PATENT OFFICE.

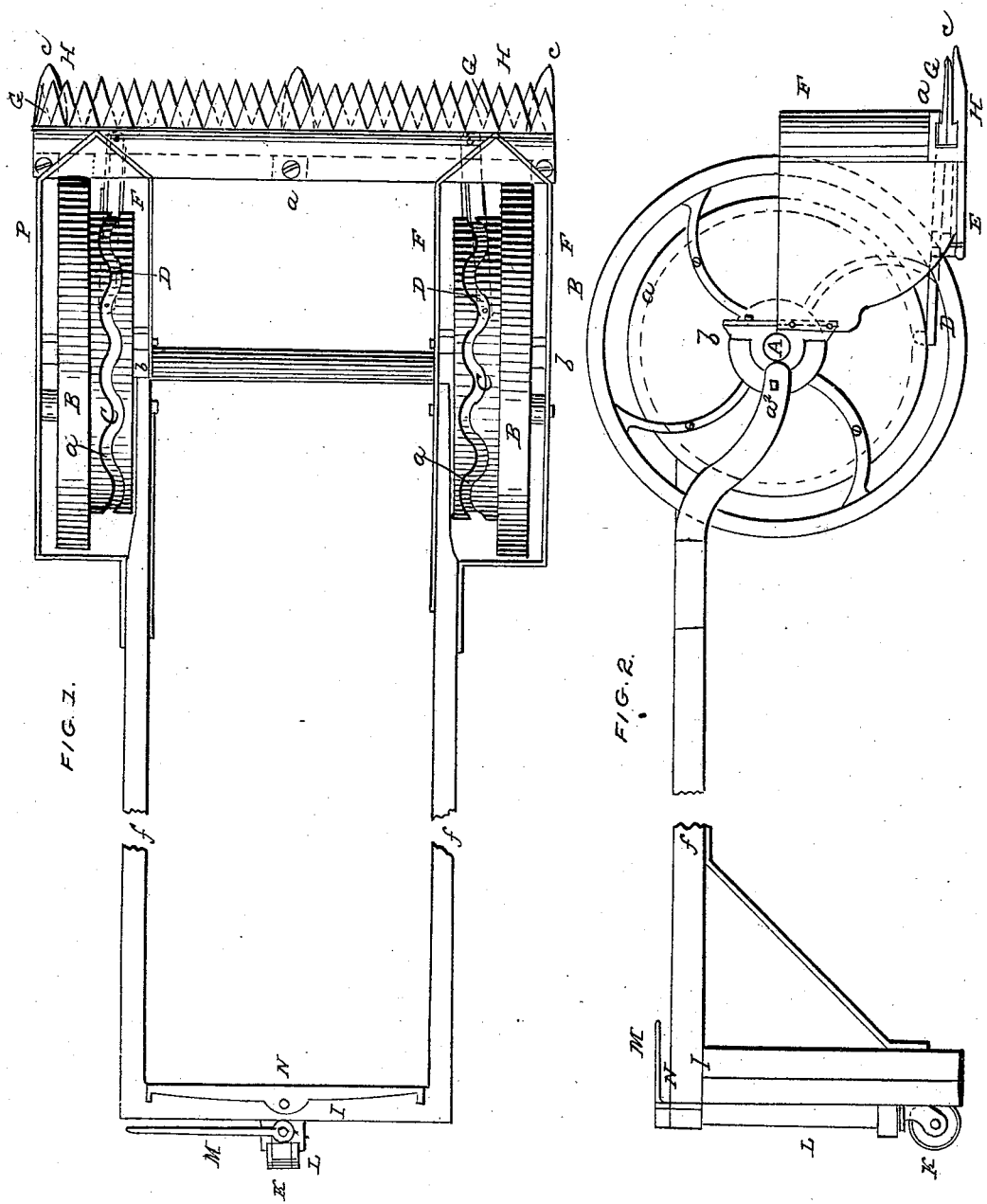

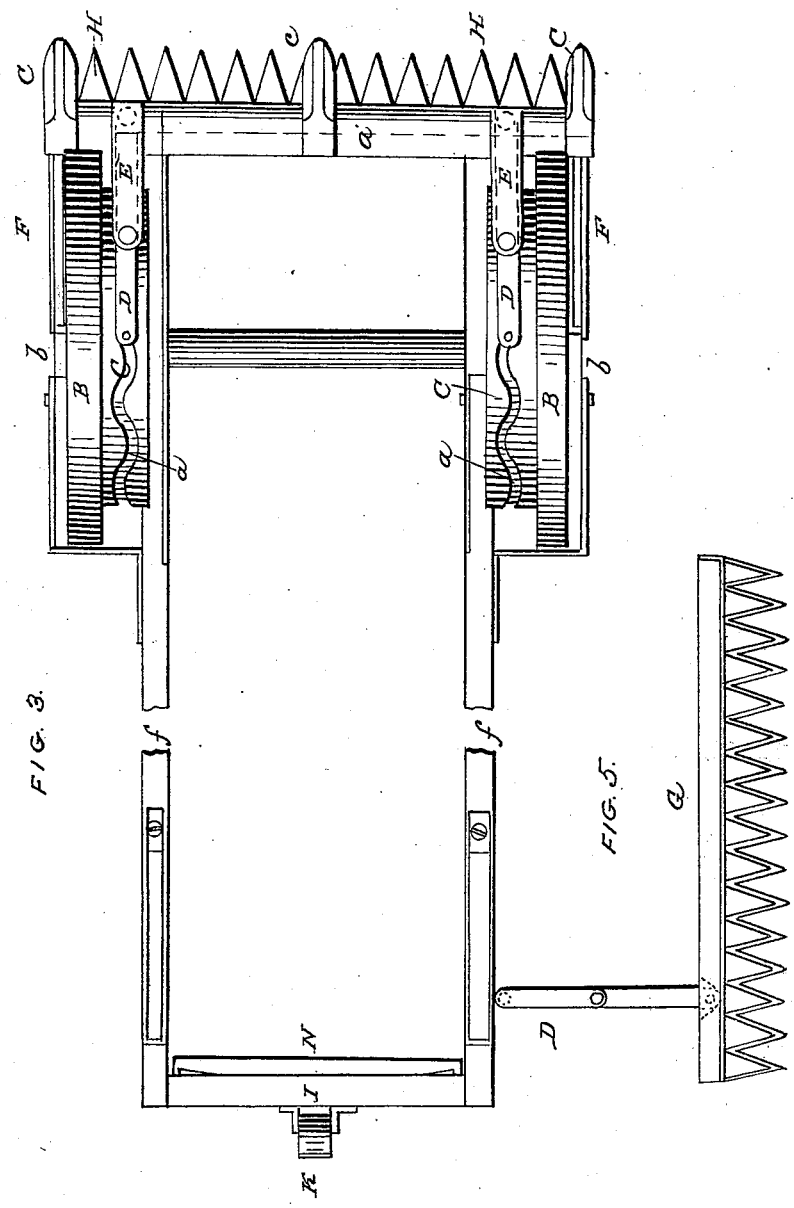

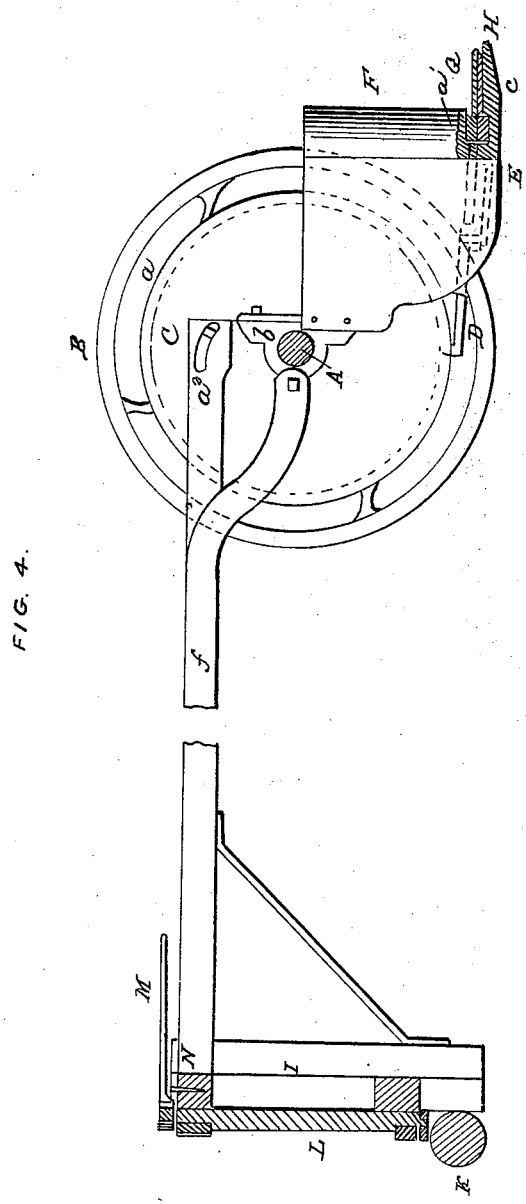

WILLIAM BACHELLER, OF WEST NEWBURY, MASSACHUSETTS.

IMPROVEMENT IN MOWING-MACHINES.

Specification forming part of Letters Patent No. 17,956, dated August 11, 1857.

*To all whom it may concern:*

Be it known that I, WILLIAM BACHELLER, of West Newbury, in the county of Essex and State of Massachusetts, have invented an Improved Mowing-Machine; and I do hereby declare that the same is fully described and represented in the following specification and the accompanying drawings, of which—

Figure 1 denotes a top view of it; Fig. 2, a side elevation of it; Fig. 3, an under side view of it; Fig. 4, a vertical central and longitudinal section of it; Fig. 5, a top view of one of its serrated cutters.

In such drawings, A denotes an axle or shaft, supported by two bearing-wheels, B B, affixed to it at or near its ends. It also carries two cam-wheels, C C, which are placed respectively between the bearing-wheels and against them, as shown in the figures. The periphery of each of these cam-wheels has a serpentine groove, $a$, formed in and entirely around it, to receive the end of or a stud from the end of one of two levers, D D, arranged below the wheels and supported by a cutter-frame, E.

The cutter-frame turns vertically on and depends from the shaft A, and is made with guards F F, to extend upward in front and by the sides of the wheels B B and C C, as shown in the drawings. These guards constitute parts of the frame, and by extending them from the knife-bar $a'$ up to the journal-boxes $b\ b$ of the cutter-frame they serve to stiffen the frame, as well as to prevent the hay or grass from clogging the wheels.

Within the cutter-bar there is arranged horizontally two serrated cutters, G H, one being placed on the other, and each being made to operate or have a reciprocating longitudinal motion independently of the other, so as to cause the sharpened sides of the angular teeth of one to operate with such sides of the teeth of the other as do the two blades of a pair of shears or scissors. Each cutter should be so jointed or connected to one of the levers D D as to receive its reciprocating motions from the vibratory movements of the lever, induced by the cam-wheel thereof when in rotation. Three runners, $c\ c\ c$, are applied to the under side of the cutter bar or frame, and serve to support the same when resting on the ground, the cutter-frame turning freely on the shaft A, in order that it may readily adapt itself to the sinuosities or irregularities of the surface of the ground over which it may pass.

A thill-frame, I, is jointed to the cutter-frame, extends backward, and is supported by a steering-wheel, K, arranged as shown in the drawings, and carried by a vertical shaft, L, from whose upper part a hand-lever, M, projects horizontally. The joints of the thill-frame and the cutter-frame E are shown at $a^2$ in Figs. 1, 2, 3, and 4, they being hinged joints, or the equivalents thereof, and constructed so as to allow either frame to play vertically independently of the other.

The thill-frame has a whiffletree, N, at its rear part, and is so jointed to the cutter-frame as to allow the latter to turn upward and downward on the shaft A and adapt itself to the irregularities of the surface, as above explained. It is intended that the horse or animal by which the machine is to be put in operation shall be placed between the bars $f\ f$ of the thill-frame and be harnessed to the whiffletree, with his head toward the axle A. The animal, while impelling the machine forward, thus moves in rear of the cutters, and of course does not trample on the grass before it is cut by them. The attendant directs the movement of the machine by laying hold of and turning the lever M and its shaft L, so as to change the plane of the wheel K into such an angle with the general longitudinal plane of the machine as will cause the machine to vary its course in the manner required.

By having two serrated knives working together, and both put in movement in opposite directions, the grass is cut off squarely and to better advantage than it generally is by one serrated cutter working against a set of stationary fingers.

By my arrangement of the cutters and the mechanism for supporting the machine and operating such cutters the weight is distributed to the best advantage for the horse or draft-animal, as well as for the correct operation of the cutters, for when the cutters extend out laterally from the thill-frame and its wheels the horse, while the machine is in operation, is acted on by a leverage which tends to incommode him by pushing him aside or out of his path.

My arrangement is also simple and requires no expensive gearing, which is always objectionable on account of its liability to make a noise and get out of order while the machine may be in use. I have sought to produce a substantial and cheap machine, one which, while it will perform its work to excellent advantage, will not be liable to be easily deranged.

It is well known that in machines propelled from the rear, as my machine is, and where the thill-frame is rigidly attached to the cutter-frame, any slight obstruction or elevation in the ground, and over which the rear or guiding wheel may pass, will have a tendency to pitch the cutters into the ground, and which is a very serious objection to this class of machines. This liability is avoided by my arrangement. Another advantage is to be found in the ease with which the thill-frame can be elevated for the purpose of permitting the animals to pass under the frame for the purpose of being harnessed thereto. In order, however, to enable such flexible connections to be used with success, it is necessary that the power for operating the cutting apparatus should be applied from both sides of the machine and near the ground, so as to avoid all twisting of the machine, and which is attained by my arrangement.

I am aware that the thill-frames and cutter-frames have been variously connected, and in many instances by flexible joints, but not in the peculiar manner above described.

Having thus described my improvement in that class of mowing-machines in which the cutting apparatus is placed in front of the animals by which the machine is propelled, what I claim therein as new, and desire to secure by Letters Patent, is—

The combination of the thill-frame I with the cutter-frame F, when said frames are constructed and used in combination with the supporting-wheels B B and operating-wheels C C, in the manner and for the purposes set forth.

In testimony whereof I have hereunto set my signature this 23d day of May, A. D. 1857.

WM. BACHELLER.

Witnesses:
   R. H. EDDY,
   F. P. HALE, Jr.